United States Patent [19]

Hughes

[11] Patent Number: 4,797,082

[45] Date of Patent: Jan. 10, 1989

[54] APPARATUS FOR FORMING SHAPED PIECES OF INSULATION

[75] Inventor: John T. Hughes, Worcester, United Kingdom

[73] Assignee: Micropore International Ltd., Worcs., United Kingdom

[21] Appl. No.: 43,544

[22] Filed: Apr. 28, 1987

Related U.S. Application Data

[62] Division of Ser. No. 894,496, Aug. 4, 1986.

[30] Foreign Application Priority Data

Aug. 16, 1985 [GB] United Kingdom ............... 8520564

[51] Int. Cl.⁴ ............................................. A01J 21/00
[52] U.S. Cl. .................................... 425/356; 425/412; 425/425; 425/469; 100/208; 100/268
[58] Field of Search ............... 425/356, 412, 425, 431, 425/457, 469, DIG. 812, DIG 202; 264/42, 43, 120; 100/259, 261, 268, 270, 208, 209

[56] References Cited

U.S. PATENT DOCUMENTS

| | | | |
|---|---|---|---|
| 937,105 | 10/1909 | Simons | 425/412 |
| 1,807,443 | 5/1931 | Senn | 425/406 |
| 2,033,411 | 3/1936 | Carson | 264/120 |
| 2,181,619 | 12/1935 | Co Van et al. | 25/90 |
| 2,360,443 | 7/1942 | Onions | 219/13 |
| 2,888,715 | 3/1957 | Frank | 18/59 |
| 3,166,617 | 1/1965 | Munk | 264/109 |
| 4,012,215 | 3/1977 | Schwab et al. | 425/406 |
| 4,073,851 | 2/1978 | Munk | 264/109 |

FOREIGN PATENT DOCUMENTS

| | | |
|---|---|---|
| 692421 | 8/1964 | Canada . |
| 809672 | 3/1959 | United Kingdom . |
| 912847 | 12/1962 | United Kingdom . |
| 2087135 | 5/1982 | United Kingdom . |
| 2148782A | 6/1985 | United Kingdom . |

*Primary Examiner*—Bernard Nozick
*Attorney, Agent, or Firm*—Browdy and Neimark

[57] ABSTRACT

Shaped pieces of insulation having non-uniform thickness but substantially uniform density are formed by simultaneously compacting and consolidating at least first and second portions of a particulate insulation material in an independent manner so as to form a shaped piece of insulation in which the first and second portions have different thicknesses in the direction of compaction. The degree of compaction of the first portion is the same as the degree of compaction of the second portion so that the shaped piece of insulation has substantially uniform density.

8 Claims, 4 Drawing Sheets

APPARATUS FOR FORMING SHAPED PIECES OF INSULATION

This is a division of application Ser. No. 894,496 filed Aug. 4, 1986.

FIELD OF THE INVENTION

The present invention realtes to a method of, and to an apparatus for, forming shaped pieces of thermal insulation material and more particularly, but not exclusively, is concerned with forming shaped pieces of insulation to be applied to pipes, the shape of each piece of insulation being substantially one half of a tube so that two shaped pieces will together enclose a length of pipe.

BACKGROUND OF THE INVENTION

The present invention applies to materials, or to mixtures of materials, which may be formed into a consolidated solid of application of pressure which causes the materials to be compacted. Of particular interest are materials known to form very high performance low thermal conductivity products which are known as microporous thermal insulation materials.

Blocks of microporous thermal insulation may be formed by intimately mixing a finely divided silica powder with an infra-red opacifier and reinforcing fibre and then applying pressure to the mixture to compact and consolidate the materials and in so doing to create between adjacent silica particles a bond of sufficient strength to provide a handleable block of material. Simple shapes such as rectangular slabs may readily be formed in this manner and slabs with a non-uniform thickness may be formed so that the final product has a profile. However, with profiled shapes problems can occur because of the nature of the insulation material. Although the flow characteristics of the unconsolidated insulation material are similar to a fluid, the material quickly loses its ability to flow with even a small amount of compaction so that a profiled shape has a non-uniform density.

When the profile is such that some portions of the slab have a thickness of example one half the thickness of other portions of the slab there may be a difference in density between the portions of different thickness such that the density of the relatively thin portions is approximately double the density of the relatively thick portions. This may mean that the relatively thick portions are soft, whereas the relatively thin portions are particularly hard and this can give rise to difficulties in handling the final product. Cracking of the profiled slab at points where there is a change in thickness is common.

For some insulation shapes such differences in density are acceptable, but frequently this is not the case and uniformity of density is highly desirable.

An important case where uniformity of density, and therefore strength, is essential is when the shape is a half pipe section. Non-uniformity of density generally causes cracks to occur and results in areas of weakness.

DESCRIPTION OF THE PRIOR ART

Various method of forming half pipe sections having a uniform density have been considered. Methods which are readily apparent are to compact the insulation mixture isostatically or to compact the mixture in the axial direction of the pipe (so-called vertical pressing). However, such methods have not produced an economically viable product.

Pressing the insulation mixture between two dies in a horizontal direction, that is having one die shaped with a convex profile corresponding to a length of half pipe section and the other die shaped with a concave profile corresponding to a length of half pipe section gives rise to all the problems of non-uniformity discussed hereinbefore.

Isostatic compaction is used very successfully for producing green body ceramic components. A typical example of such isostatic pressing is the manufacture of a ceramic tube in which a central former is contained within a larger diameter flexible rubber membrane. The space between the former and the membrane is filled with ceramic powder, which may be vibrated to release trapped air, and the annular spaces between the ends of the former and the surrounding rubber membrane are plugged and the assembly enclosed within a pressure vessel. Air pressure outside the rubber membrane is raised to cause compaction of the ceramic powder against the central former and when the air pressure is released the ceramic powder remains in its compacted condition and may be removed from the former as a handleable tube of uniform thickness ready for firing.

It would appear that this techique is ideally suited to producing tubes of microporous insulation material which eventually could be cut in a lengthwise direction to produce two half pipe sections. Unfortunately this is not the case. We have found that the large amount of compaction needed—about 5 to 1 in volume—makes it very difficult to control the shape at the ends of the tube. A further difficulty is non-uniform starting density for the powder filling which gives rise to non-uniform thickness of the final product. Yet another problem is the tendency of the product to crack when the compacting air pressure is released because the resilient nature of the compacted insulation mixture causes it to expand. This process has been found to be entirely unsuitable for producing a high quality tubular shape of microporous insulation material.

A more successful method of producing tubular or half-tubular shapes of microporous insulation material has been the application of compacting pressure in the axial direction of the tube. A tubular die is filled with the insulation mixture and a punch tool slowly applies pressure in the axial direction to compact the insulation. When the compacted material is removed from the die after releasing the pressure it is of good circular shape and is a satisfactory short piece of tube insulation. Unfortunately the tube is necessarily short because, if a large amount of mixture is introduced into the die, the longer tube length produced has a relatively high density at the end in contact with the punch tool and a relatively low density at the end remote from the punch tool and the resulting tube is unsatisfactory. An improvement is achieved if a short piece of tube insulation is pressed and left in the die while further mixture is introduced thus allowing a second pressing operation to take place with a second short piece of tube insulation being formed on the end of the first tube. Repeating this operation several times produces a long tube which is reasonably handleable on removal from the die. A weakness exists where one pressed tube piece adjoins its neighbour and here the tube may easily be broken. The main disadvantage of this method, however, is the very slow manufacturing rate, although the method can be used to form half pipe sections without the need to cut a tube into two sections.

A commercially viable method would however require to be capable of forming half pipe sections in lengths of about one meter at high speed. We have, therefore, tried pressing the microporous insulation mixture in a die one meter long where the die has a concave half cylindrical shape laid in a horizontal direction and contained within vertical walls and the punch tool has a convex half cylindrical shape with flat horizontal strips along its length so that when the die and the punch tool are closed they enclose a half pipe section space. The die was first charged with the insulation mixture and then the punch tool was slowly pressed to its closed position. When the resulting half pipe section was removed from the mould it was found to be of poor shape because of severe cracking and there were substantial differences in density between the compacted material at the centre of the half pipe section and the material at the side walls. The side walls were soft and crumbled easily.

OBJECT OF THE INVENTION

It is an object of the present invention to provide a method and an apparatus for forming shaped pieces of insulation of non-uniform thickness but of substantially uniform density by selective application of pressure to different portions of the insulation mixture.

SUMMARY OF THE INVENTION

According to a first aspect of the present invention there is provided a method of forming shaped pieces of insulation having non-uniform thickness but substantially uniform density, which method comprises the steps of:

introducing a particulate insulation material into a die;

simultaneously compacting and consolidating at least first and second portions of the insulation material in an independent manner so as to form a shaped piece of insulation in which said first and second portions have different thicknesses in the direction of compaction, the degree of compaction of said first portion being the same as the degree of compaction of said second portion so that said shaped piece of insulation has substantially uniform density; and removing the shaped piece of insulation from the die.

According to a second aspect of the present invention there is provided an apparatus for forming shaped pieces of insulation having a non-uniform thickness but substantially uniform density, which apparatus comprises:

a die for receiving a particulate insulation material;

at least first and second plungers which are operable simultaneously within said die so as to compact and consolidate independently at least first and second portions of the insulation material to form a shaped piece of insulation in which said first and second portions have different thicknessesin the direction of compression, wherein the stroke cycle of said first plunger is different to the stroke cycle of said second plunger so that the shaped piece of insulation has substantially uniform density; and means for removing the shaped piece of insulation from the die.

The particulate insulation material may be a microporous insulation material, for example finely divided silica such as pyrogenic silica or silica aerogel. the microporous insulation material may include up to 40 percent by weight of an infra-red opacifier which may be a radiation scattering material having a high refractive index such as titania, alumina, zirconia, iron oxide or chrome oxide, a radiation absorbing material such as carbon black or a radiation reflecting material such as a metal. The opacifier may be in the form of a powder, short fibres or flakes. The microporous insulation material may include up to 50 percent by weight of a reinforcing fibre such as ceramic fibre, glass fibre or other inorganic or organic fibre.

The stroke cycle of the plungers may be such that the stroke of the first and second plungers is dependent on the density change to be achieved and on the final thickness of the respective portion.

The first and second portions may be compacted at different rates by operating the first plunger at a different speed to the second plunger. However, it is preferable that the first and second plungers are operated so that the first and second portions attain their final thickness substantially simultaneously.

The first plunger may transmit pressure applied thereto to the second plunger by way of a resilient separating member which may be, for example, a compressible rubber material or a spring.

The shaped piece of insulation may be removed from the die by dismantling the die or by ejecting the insulation from the die.

For a better understanding of the present invention and to show more clearly how it may be carried into effect reference will now be made, by way of example, to the accompanying drawings in which:

DESCRIPTION OF PREFERRED EMBODIMENT

Figure 1:
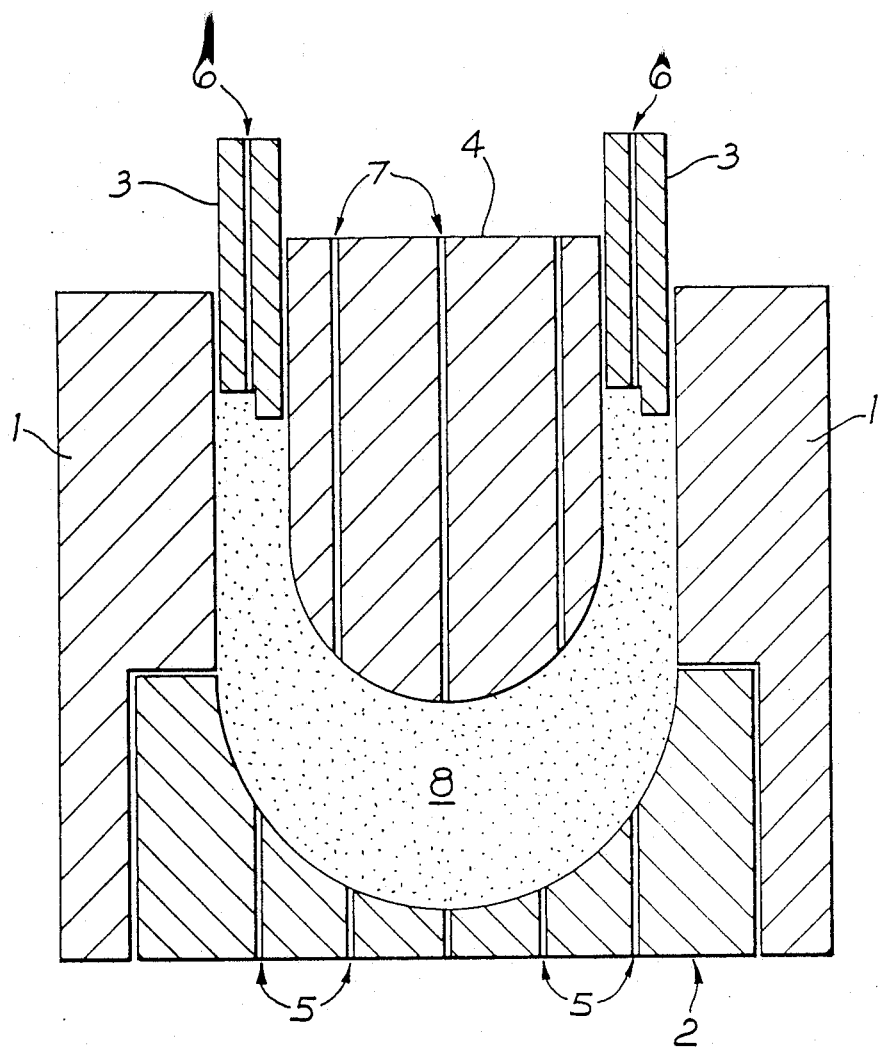
FIG. 1 is a cross-sectional view through one embodiment of a die for producing a half pipe shaped piece of insulation material.

The die shown in FIG. 1 comprises opposing side walls 1, a base 2 and end walls (not shown) which may be made of any suitable material. The punch comprises a pair of elongate outer plungers 3 and a central plunger 4. Holes 5, 6 and 7 are shown in the base the outer plungers and the central plunger respectively, but it is not essential that holes should be formed in all of these components. The base 2 is shaped to correspond to the desired shape of the outer surface of the half pipe section, the central plunger is shaped to correspond to the desired internal shape of the half pipe section and the outer plungers are formed to determine the shape of the mating surfaces of the half pipe section. As shown, the mating faces are stepped, but any suitable shape may be adopted and the mating faces may be flat if desired.

In operation, the female part of the die is first assembled by locating together the side walls 1, the base 2 and the end walls. Microporous insulation mixture 8 is then poured into the mould and the outer plungers 3 and the central plunger 4 are located into the top of the mould. Downwards pressure is applied to the plungers 3 and 4 so that the microporous insulation mixture is compacted with excess air excaping by way of the holes 5, 6 and 7.

The pressure applied to the plunger 4 is controlled so that the rate of movement of the plunger 4 is different with respect to the rate of movement of the plungers 3. Ideally, the plungers 3 will reach their final compaction point at the moment that the plunger 4 reaches the end of its travel, although the plungers 3 will travel further than the plunger 4.

Figure 2:
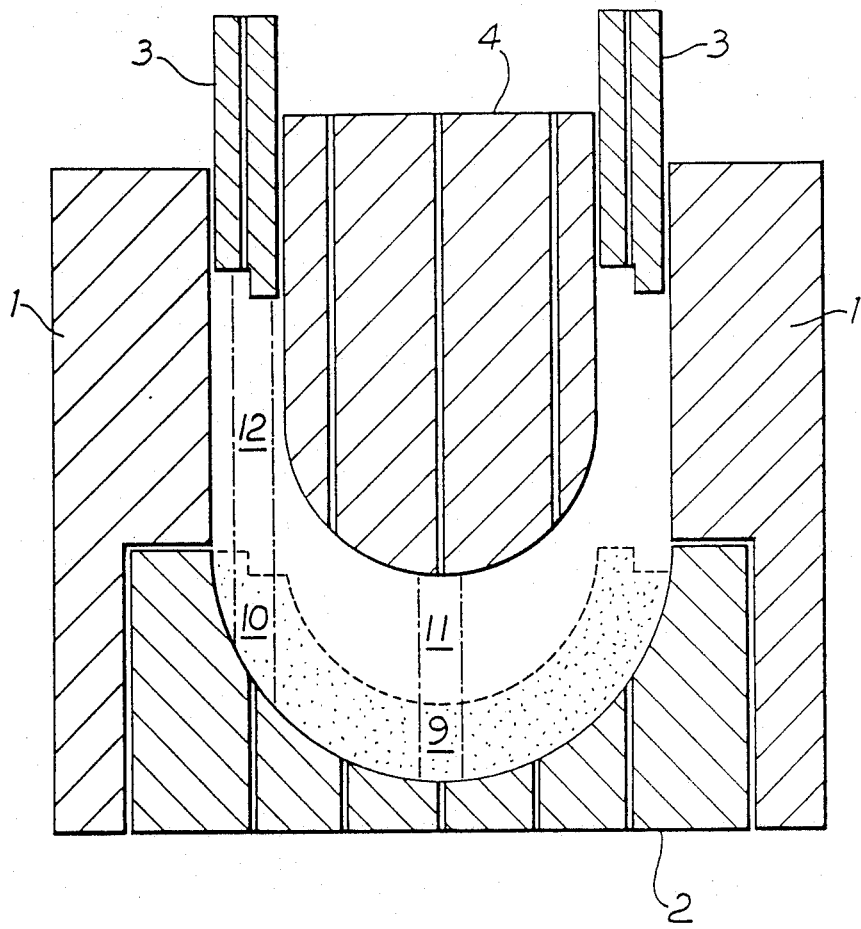
FIG. 2 shows the manner in which the microporous insulation mixture is compressed.

The manner in which the microporous insulation mixture is compressed is illustrated in FIG. 2. It can be seen from FIG. 2 that the vertical thickness of the final half pipe section in region 9 is less than the vertical thickness of region 10. By way of example, for a 25 mm radial thickness of pipe insulation to suit a 100 mm diameter pipe, the thickness of region 9 is substantially 25 mm whereas the thickness of region 10 is approximately 50 mm.

As the plungers 3 and 4 enter the mould and make contact with the microporous insulation mixture, the mixture behaves at first like a fluid and occupies the space beneath the plungers 3 and 4 with substantially an even density. Thus, as the density of the mixture is increased by compaction from its original free flow density of typically 40 Kg/m$^3$ to about 100 Kg/m$^3$ the mixture readily flows, but at densities above about 100 Kg/m$^3$ the mixture does not readily flow so that as the mixture is further compacted the mixture in a column 11 will constitute region 9 and the mixture in a column 12 will constitute region 10.

Since it is desirable in this embodiment that the density of the material in region 9 is substantially the same as the density of the material in region 10 then the degree of compaction of column 11 must be the same as the degree of compaction of column 12. In the example described above where a final density of 300 Kg/m$^3$ may be required, the height of column 11 at a density of 100 Kg/m$^3$ must be substantially 75 mm and the height of column 12 at the same density must be substantially 150 mm. It follows that the travel or stroke cycle of the plunger 4 from a point equivalent to substantially 100 Kg/m$^3$ density to final compaction is substantially 50 mm, whereas the travel or stroke cycle of the plungers 3 from a point equivalent to substantially 100 Kg/m$^3$ density to final compaction is substantially 100 mm.

Ideally, the time taken for the outer plungers 3 to travel the 100 mm is the same as the time taken for the central plunger 4 to travel its 50 mm in order that the plungers 3 and 4 should reach the full extent of their travel substantially simultaneously. Such an arrangement results in a half pipe section moulding which has a uniform texture and is free from cracks, and which may be removed from the mould by simple ejection techniques or by dismantling the mould.

Although it is not essential that the plungers 3 and 4 should reach their limits of travel simultaneously and half pipe sections have been successfully moulded when the plungers 3 and 4 have been caused to move quite independently, in general a better quality moulding is produced when the plungers do simultaneously reach their limits of travel.

The composition of the microporous insulation mixture used to produce the final shaped article may consist of an intimate mixture of about 40 to 90 percent by weight finely divided silica (pyrogenic silica or silica aerogel), up to 40 percent by weight of an infra-red opacifier and up to 50 percent by weight of a reinforcing fibre.

The opacifier may be a radiation scattering material having a high refractive index such as titania, alumina, zirconia, iron oxide or chrome oxide, a radiation absorbing material such as carbon black or a radiation reflecting material such as a metal. The opacifier may be in the form of a powder, short fibres or flakes.

The reinforcing fibre may be, for example, ceramic fibre, glass fibre on other inorganic or organic fibre.

In addition, a binding agent or a binding catalyst may be incorporated into the mixture.

The density at which the microporous insulation mixture ceases to flow readily depends upon the relative proportions of the constituents used. However, the most effective distances of travel of the plungers 3 and 4 can readily be determined by simple tests which require no inventive capability.

The movements of the plungers 3 and 4 may be controlled in a number of ways, but we have devised a particularly simple method which makes it possible to use the most inexpensive of presses, that is a single ram or platen press.

Figure 3:
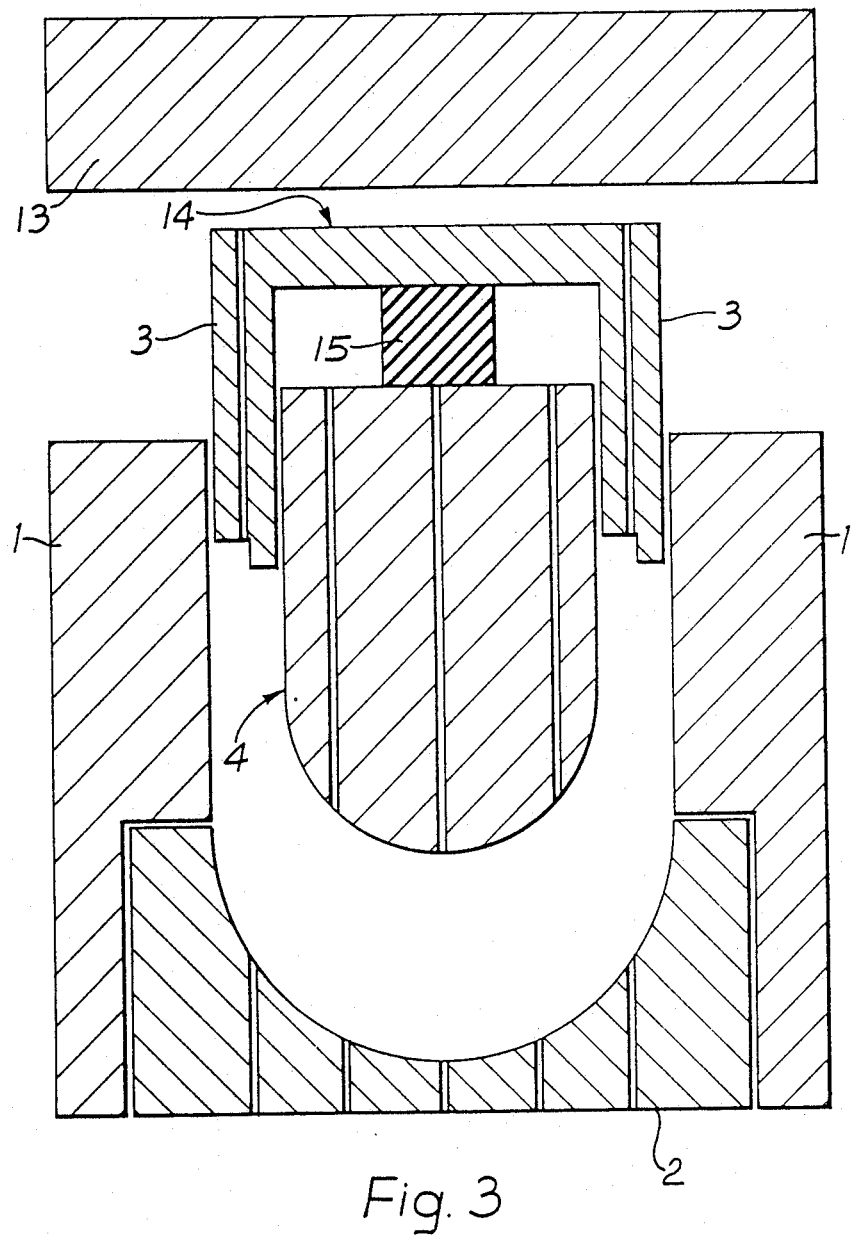
FIG. 3 shows in more detail a part of a platen press incorporating inner and outer plungers.
Figure 4:
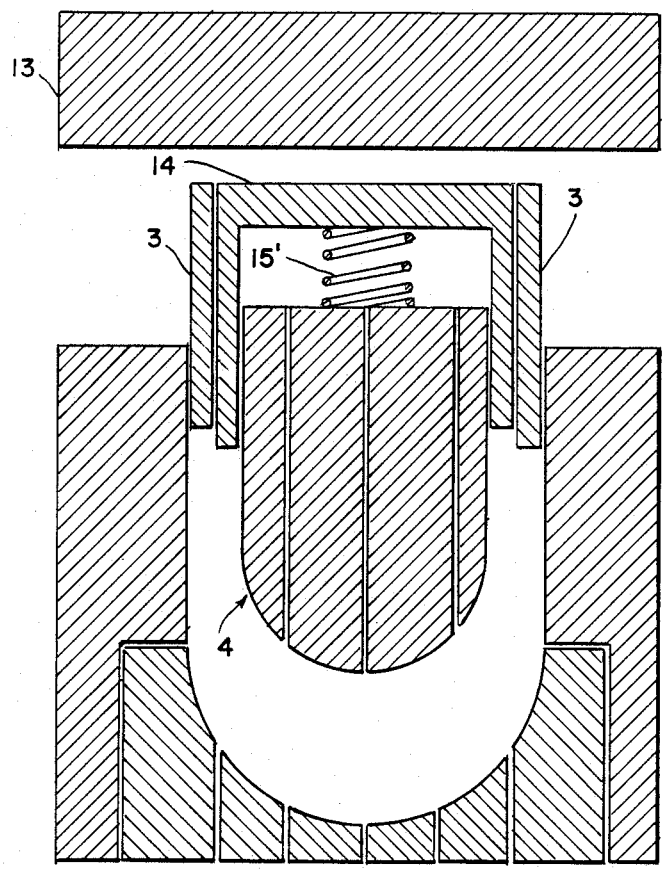
FIG. 4 shows a variant of the embodiment shown in FIG. 3.

The details of the plungers 3 and 4 are shown in FIG. 3. As shown in FIG. 3, a ram 13 of a press is arranged to be urged against a connecting portion 14 which interconnects the two outer plungers 3. Within a recess formed between the two outer plungers 3 there is provided a spring means 15 or 15' which acts between the connecting portion 14 and the central plunger 4. The spring means 15 may be, for example, a coil spring 15' (FIG. 4) or, preferably, a block of compressible rubber 15.

When pressure is applied to the connecting portion 14 to cause the connecting portion 14 and the outer plungers 3 to move downwardly, pressure is also transmitted to the central plunger 4 by way of the spring means 15 so that the plungers 3 and 4 move together. As the density of the microporous insulation mixture beneath the plunger 4 increases the resistance to movement of the plunger 4 becomes greater. However, during the time that the density of the microporous insulation mixture beneath the plungers 3 offers less resistance to movement than the mixture beneath the plunger 4, the plungers 3 move faster than the plunger 4 and the spring means 15 becomes compressed.

The properties of the spring means, for example the thickness and the hardness of the compressible rubber, may be chosen to give good control of the relative movements of the plungers 3 and 4.

The manufacturing of shaped pieces of insulation having a half pipe section has been described because we have found such shapes particularly difficult to produce from microporous insulation mixtures. However, it should be noted that the present invention is not limited to the manufacture of half pipe sections and that other shapes may be produced where the final thickness of the shape is not uniform, but where a substantially uniform density is required. By virtue of the microporous structure of the insulation material provided by compaction bonding of the finely divided silica the final shaped pieces of insulation provide exceptionally good thermal insulation performance.

I claim:

1. An apparatus for forming shaped pieces of insulation having a non-uniform thickness in the direction of compression thereof but substantially uniform density, which apparatus comprises:

a die for receiving a compressible flowable particulate material, which die comprises side walls and a base;

first and second plungers movable within the die;

means for moving the first and second plungers within the die in a first stage, said plungers being moved simultaneously so as to compact the insulation material and to cause the insulation material to flow and to become distributed within the die in an homogeneous manner, and subsequently in a second stage, means to move said plungers simultaneously and through different distance stroke cycles so as to compact and consolidate first and second portions of the insulation material in an independent manner so as to form a shaped piece of insulation in which first and second portions have different thicknesses in the direction of compaction but the degree of compaction of the first portion is the same as the degree of compaction of the second portion so that the shaped piece of insulation has substantially uniform density;

means for causing the strokes of the first and second plungers to vary dependent upon the density change of the insulation of the respective portion; and means for permitting the escape of gas from within the die.

2. An apparatus according to claim 1, wherein the means for moving the first and second plungers moves the first plunger at a different speed relative to that of the second plunger.

3. An apparatus according to claim 1, wherein the means for moving the first and second plungers moves the plungers so that the plungers attain simultaneously positions defining the final thickness of the first and second portions.

4. An apparatus according to claim 1 and including means for operating the first and second plungers so that the plungers attain simultaneously positions defining the final thickness of the first and second portions.

5. An apparatus according to claim 1 and including a resilient separating member interposed between the first and second plungers for transmitting compressive pressure applied to the first plunger to the second plunger.

6. An apparatus according to claim 5, wherein the resilient separating member comprises a compressible rubber material.

7. An apparatus according to claim 5, wherein the resilient separating member comprises a spring.

8. An apparatus for forming shaped pieces of insulation essentially in the form of a half cylinder having essentially uniform density, which apparatus comprises:

a die for receiving a compressible flowable particulate material, which die comprises side walls and a base shaped essentially in the form of the exterior of a half cylinder having a horizontal axis;

first and second plungers movable within the die;

means for moving the first and second plungers within the die in a first stage, said plungers being moved simultaneously so as to compact the insulation material and to cause the insulation material to flow and to become distributed within the die in an homogeneous manner, and subsequently in a second stage, means to move said plungers simultaneously and through different distance stroke cycles so as to compact and consolidate first and second axialy extending portions of the insulation material in an independent manner so as to form a shaped piece of insulation essentially in the form of a half cylinder in which first and second axially extending portions have different thicknesses in the direction of compaction but the degree of compaction of the first portion is the same as the degree of compaction of the second portion so that the shaped piece of insulation has essentially uniform density;

means for causing the strokes of the first and second plungers to vary dependent upon the density change of the insulation of the respective portion; and means permitting the escape of gas from within the die.

* * * * *